United States Patent
Yang et al.

(10) Patent No.: US 11,598,516 B1
(45) Date of Patent: Mar. 7, 2023

(54) FOLDING GROW LIGHT

(71) Applicant: LONGHORN INTELLIGENT TECH CO., LTD, Shenzhen (CN)

(72) Inventors: Haitao Yang, Shenzhen (CN); Lin Yang, Shenzhen (CN); Feng Zhu, Shenzhen (CN); Zhiqing Zhu, Shenzhen (CN)

(73) Assignee: LONGHORN INTELLIGENT TECH CO., LTD., Shenzhen (CN)

( * ) Notice: Subject to any disclaimer, the term of this patent is extended or adjusted under 35 U.S.C. 154(b) by 0 days.

(21) Appl. No.: 17/675,923

(22) Filed: Feb. 18, 2022

(51) Int. Cl.
| | |
|---|---|
| *F21V 23/00* | (2015.01) |
| *F21V 21/116* | (2006.01) |
| *F21V 21/26* | (2006.01) |
| *F21V 21/30* | (2006.01) |
| *A01G 7/04* | (2006.01) |
| *F21Y 115/10* | (2016.01) |
| *F21Y 103/10* | (2016.01) |

(52) U.S. Cl.
CPC ............ *F21V 23/003* (2013.01); *A01G 7/045* (2013.01); *F21V 21/116* (2013.01); *F21V 21/26* (2013.01); *F21V 21/30* (2013.01); *F21Y 2103/10* (2016.08); *F21Y 2115/10* (2016.08)

(58) Field of Classification Search
CPC ........ A01G 7/045; A01G 9/249; F21V 21/26; F21V 21/30; F21S 4/28; F21S 8/066
See application file for complete search history.

(56) References Cited

U.S. PATENT DOCUMENTS

| | | | |
|---|---|---|---|
| 8,459,836 B2* | 6/2013 | Chang | F21V 21/30 362/249.02 |
| 10,517,231 B2* | 12/2019 | Thosteson | F21V 23/003 |
| 10,842,082 B1* | 11/2020 | Genga, Jr. | F21V 21/15 |
| 10,941,927 B1* | 3/2021 | Yang | F21S 4/28 |
| 2013/0283683 A1* | 10/2013 | Ringbom | F21V 14/04 362/284 |
| 2018/0087755 A1* | 3/2018 | Yorio | F21V 17/007 |
| 2020/0041109 A1* | 2/2020 | Van Der Schyf | F21V 21/14 |

* cited by examiner

*Primary Examiner* — William N Harris
(74) *Attorney, Agent, or Firm* — Clement Cheng

(57) ABSTRACT

A folding grow light has a main body with a main body housing. A driver is installed to the main body. The folding grow light has a right folding arm and a left folding arm. The right folding arm holds at least three linear arrays of LED lights perpendicular to the right folding arm. The left folding arm holds at least three linear arrays of LED lights perpendicular to the left folding arm. A right front main joint and a right rear main joint connect the main body to the right folding arm. The right folding arm rotates from a first position that is folded in a vertical orientation to a second position that is unfolded in a horizontal orientation.

18 Claims, 5 Drawing Sheets

FOLDING GROW LIGHT

FIELD OF THE INVENTION

The present invention is in the field of folding grow lights.

DISCUSSION OF RELATED ART

A variety of different folding grow lights provide portable lighting for hydroponic cultivation. For example in United States patent registration number U.S. Pat. No. 4,045,911A titled Versatile horticultural growth apparatus invented by R. Louis Ware published on Sep. 6, 1977 the abstract discloses "A versatile yet highly simplified and exceptionally utilitarian plant growth apparatus assembly is comprised of a combination, in desired practical plurality, disposition and geometry and arrangement, of several individual and self-contained functional units and structures that are modular in nature and applicability and cooperable for engagement and association with one another so as to constitute the wanted and/or necessary resultant effective and operable assembly; the modular units being severally and characteristically in the nature of either mechanical structure members and/or environmental control systems electrical or otherwise in nature and/or light-providing components; the several said units further being peculiarly adapted for very quick and easy mounting and construction into, change and alteration within, addition to or disassembly from the structured apparatus assembly."

For example in United States patent registration number U.S. Pat. No. 9,451,743B2 titled Rotating induction grow light system invented by Kurt Koerner et al. published on Sep. 27, 2016 the abstract discloses, "A rotating induction growth light system and method are disclosed. The rotating induction growth light includes a mounting bracket assembly and a light source assembly rotatably coupled to the mounting bracket assembly. The light source assembly has a first side subassembly and a second side sub assembly opposite the first side subassembly. The light source assembly is configured to rotate between a first position wherein the first side subassembly is facing away from the mounting bracket assembly and at least a second position wherein the second subassembly is facing away from the mounting bracket assembly. A method of providing light to a plant is disclosed, including: directing a vegetative side subassembly of a light source assembly toward a plant; and rotating the light source assembly until a flowering side subassembly is directed toward the plant, the flowering side subassembly positioned on the light source assembly opposite the vegetative side subassembly."

SUMMARY OF THE INVENTION

An object of the present invention is to provide a portable grow light for hydroponic cultivation.

A folding grow light has a main body with a main body housing. A driver is installed to the main body. The folding grow light has a right folding arm and a left folding arm. The right folding arm holds at least three linear arrays of LED lights perpendicular to the right folding arm. The left folding arm holds at least three linear arrays of LED lights perpendicular to the left folding arm. A right front main joint and a right rear main joint connect the main body to the right folding arm. The right folding arm rotates from a first position that is folded in a vertical orientation to a second position that is unfolded in a horizontal orientation.

A left front main joint and a left rear main joint connect the main body to the left folding arm. The left folding arm rotates from a first position that is folded in a vertical orientation to a second position that is unfolded in a horizontal orientation. A front right folding tip joint connects the right folding arm to a right folding branch and a rear right folding arm tip joint connects the right folding arm to the right folding branch. A front left folding tip joint connects the left folding arm to a left folding branch and a rear left folding arm tip joint connects the left folding arm to the left folding branch. A right lower light is mounted to the right folding branch, and a left lower light mounted to the left folding branch.

The main body housing retains the driver within the main body housing. A plug is mounted to the main body housing. A socket is formed opposite the plug. The main body housing is formed as an aluminum extrusion. The socket has a first electrical connection and a second electrical connection to allow multiple units of the folding grow light to be connected in a chain.

An intermediate mode is between the folded mode and the deployed mode, wherein the front right folding tip joint and the rear right folding arm tip joint are located opposite the front left folding arm tip joint and the rear left folding arm tip joint, wherein the folding grow light is partially unfolded in the intermediate mode with the right folding arm and the left folding arm in a horizontal position, and with the right folding branch and the left folding branch in a horizontal position.

The folding grow light has a left front rail formed on the left front branch member, and a left rear rail formed on the left rear branch member. The left lower light is mounted to the left folding branch between the left front rail and the left rear rail. The left lower light is vertically adjustable in its deployed mode, and horizontally adjustable in its intermediate mode.

The right front main joint, right rear main joint, left front main joint, and left rear main joint are formed as locking joints so that the right folding arm, and the left folding arm lock into a horizontal position after being rotated from a vertical position. The frame can have a double level, and the frame can include an upper pan and a lower pan. The main body is mounted to the frame.

A right front rail is formed on the right front branch member, and a right rear rail is formed on the right rear branch member. The right lower light is mounted to the right folding branch between the right front rail and the right rear rail. The right lower light is vertically adjustable in its deployed mode, and horizontally adjustable in its intermediate mode.

The following call out list of elements can be a useful guide for in referencing the element numbers of the drawings.
10 Folding Grow Light
11 First Folding Grow Light
12 Second Folding Grow Light
13 Third Folding Grow Light
14 Fourth Folding Grow Light
15 Fifth Folding Grow Light
16 Sixth Folding Grow Light
20 Right Folding Arm
21 Front Right Folding Arm Tip Joint
22 Rear Right Folding Arm Tip Joint
23 Right Front Main Joint
24 Right Rear Main Joint
25 Right Front Rail Gap
30 Main Body
31 Main Body Housing
32 Plug
33 First Electrical Connection
34 Second Electrical Connection
35 Socket
40 Left Folding Arm
41 Front Left Folding Arm Tip Joint
42 Rear Left Folding Arm Tip Joint
43 Left Front Main Joint
44 Left Rear Main Joint
45 Left Front Rail Gap
51 Proximal Right Array
52 Intermediate Right Array
53 Distal Right Array
61 Proximal Left Array
62 Intermidate Left Array
63 Distal Left Array
70 Right Folding Branch
71 Right Lower Light
72 Right Front Branch Member
73 Right Front Rail
74 Right Rear Branch Member
75 Right Rear Rail
76 Right Front Rail Connection
77 Right Rear Rail Connection
80 Left Folding Branch
81 Lower Left Light
82 Left Front Branch Member
83 Left Front Rail
84 Left Rear Branch Member
85 Left Rear Rail
86 Left Front Rail Connection
87 Left Rear Rail Connection
90 Frame
91 Frame Vertical Support Member
91 Frame Horizontal Support Member
93 Upper Pan
94 Lower Pan
95 Middle Pan

DETAILED DESCRIPTION OF THE PREFERRED EMBODIMENT

Figure 1:
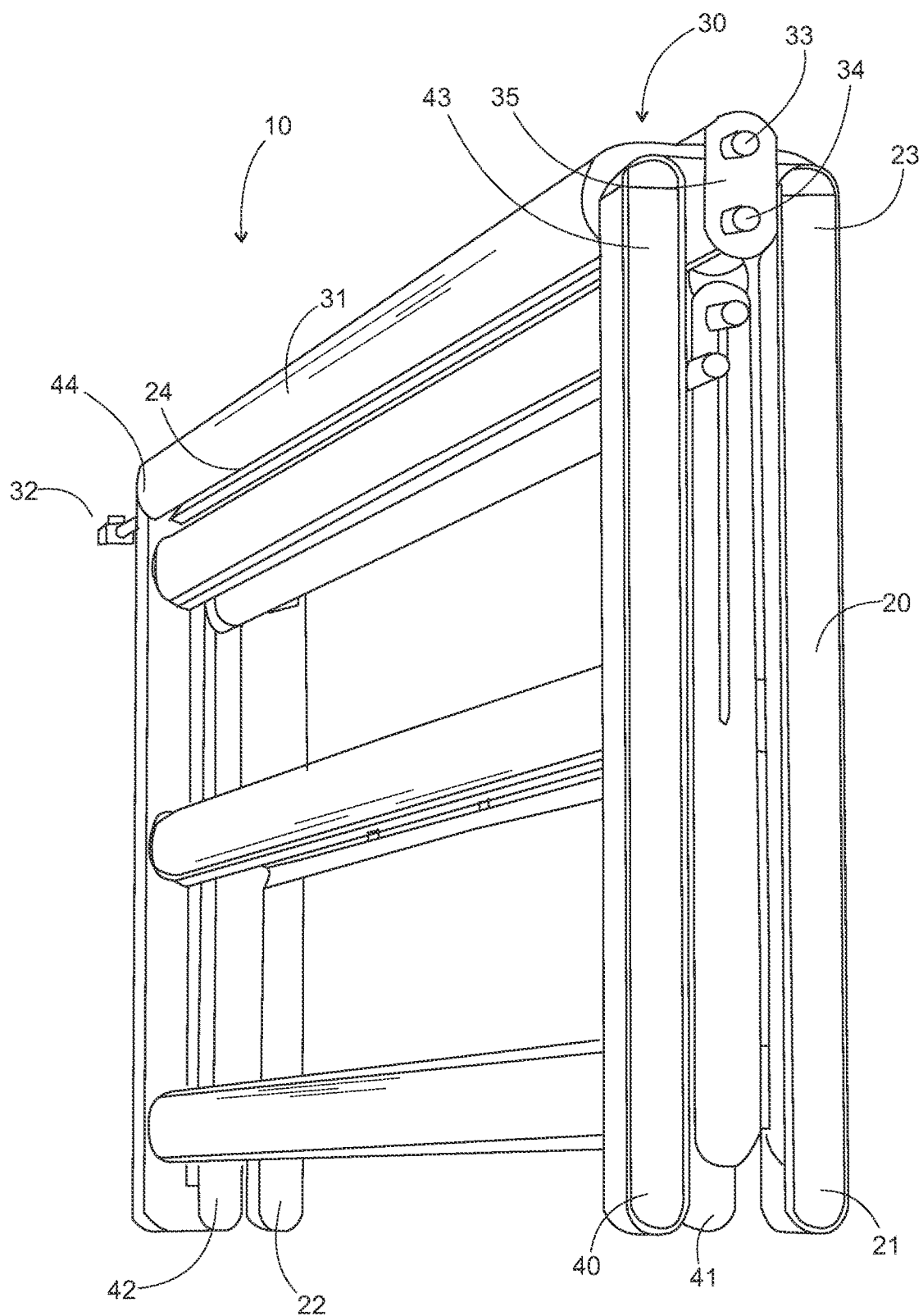
FIG. 1 is a folded view of the present invention in the folded mode.

As seen in FIG. 1, the present invention folding grow light 10 has a first position that is folded. A carry strap can be formed on an upper portion of the folding grow light 10 in folded position in a first mode such that a user can carry it around like a briefcase. A user can carry a pair of folded folding grow lights 10. The folding grow light 10 has aluminum members and LED light arrays that are electrically powered. A driver can be installed in the main body 30 for powering the LED light arrays.

A right folding arm 20 holds three linear arrays of LED lights, and a left folding arm 40 also holds an additional three linear arrays of LED lights. The arrays of LED lights are facing each other when the pair of folding arms are in folded position. The right folding arm 20 has a front right folding tip joint 21 and a rear right folding arm tip joint 22. The right folding arm 20 has a right front main joint 23 and a right rear main joint 24 connecting to the main body housing 31 of the main body 30. The main body housing also has an opening for a plug 32 to provide electrical power to the driver in the main body. The main body housing 31 is preferably an aluminum extrusion that acts as a heat sink. The main body housing 31 has a socket 35 with a first electrical connection 33 and a second electrical connection 34. The socket 35 is preferably mounted on an opposite side of the plug 32 so that the folding grow lights 10 can be chained in a series.

The left folding arm 40 has a left front main joint 43 and a left rear main joint 44 connecting to the main body. The left folding arm 40 has a front left folding arm tip joint 41 and a rear left folding arm tip joint 42.

Figure 2:
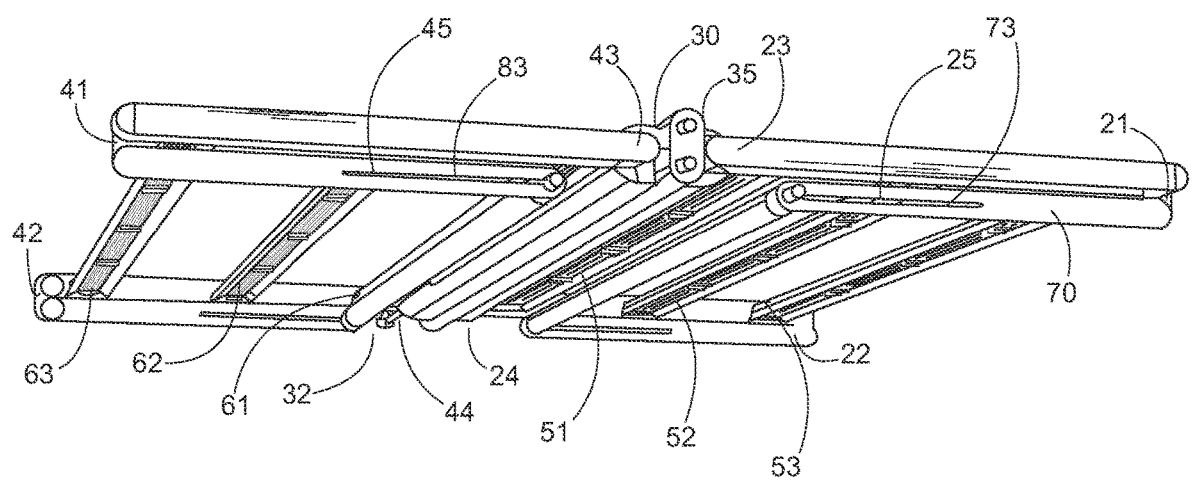
FIG. 2 is a partially unfolded view of the present invention in an intermediate mode.

As seen in FIG. 2, in the intermediate mode, the front right folding tip joint 21 and the rear right folding arm tip joint 22 are located opposite the front left folding arm tip joint 41 and the rear left folding arm tip joint 42 when the folding grow light 10 is in the intermediate mode being partially unfolded. The right front main joint 23, right rear main joint 24, left front main joint 43, and left rear main joint 44 can be locking joints so that the right folding arm 20, and the left folding arm 40 are locked into a horizontal position after being rotated from a vertical position. The right front rail 73 has a right front rail gap 25 extending along a portion of the right folding branch 70. The right front rail gap 25 is preferably at least half of the length of the right folding branch 70. In an intermediate mode, all of the lights are above the plants. The folding grow light 10 can operate in the intermediate mode. Similarly, the left front rail 83 has a left front rail gap 45 which can receive a portion of the adjustable branch lights. The rails allow adjustment of the branch lights formed at the tips. The branch lights allow the light to be directed close to the soil. This allows plant growth after germination, and also allows light to enter under a plant canopy.

The plug 32 and socket 35 of numerous chained folding grow lights 10 can be electrically connected to provide a chained string of folding grow lights 10. The folding grow light 10 thus has a number of LED light arrays which include a proximal right array 51, an intermediate right array 52, and a distal right array 53 in the right folding arm 20. The left folding arm 40 can retain and power the proximal left array 61, the intermediate left array 62, and the distal left array 63. The right lower light 71 and the left lower light 81 can be adjusted in a horizontal position.

Figure 3:
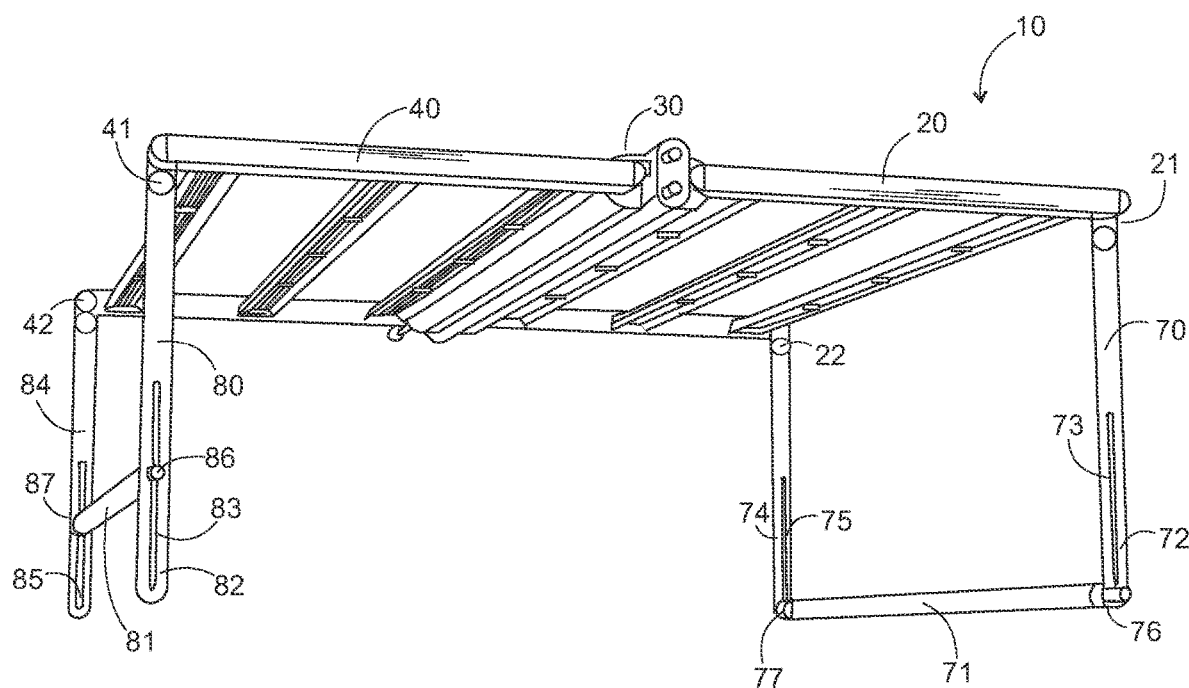
FIG. 3 is a completely unfolded view of the present invention in a deployed mode.

As seen in FIG. 3, the folding grow light 10 is in a fully unfolded position which is the deployed mode. The right folding arm 20 and the left folding arm 40 are horizontally oriented. The front right folding tip joint 21 and the rear right folding arm tip joint 22 connect the right folding arm 22 the right folding branch 70. The right folding branch 70 provides a support for the right lower light 71. The main body 30 supports the right folding arm 20 at the right front main joint 23 and the right rear main joint 24. Similarly, the left folding arm 40 has a front left folding arm tip joint 41 and a rear left folding arm tip joint 42 connecting to a left folding branch 80. The left folding branch 80 provides a support for the left lower light 81.

The right lower light 71 is held between the right front branch member 72 where the right front rail connection 76 connects to the right front rail 73 and the right rear branch member 74 where the right rear rail connection 77 connects to the right rear rail 75. In the third mode, which is the deployed mode, the folding grow light 10 is fully unfolded and the right lower light 71 can be adjusted in a vertical direction. The right lower light 71 is height adjustable on the rails. The left lower light 81 is held between the left front branch member 82 and left rear branch member. The left lower light 81 has a left front rail connection 86 that connects to the left front branch member 82 at a left front rail 83. The left lower left light 81 also has a left rear rail connection 87 connecting to the left rear rail 85 formed on the left rear branch member 84. The left lower light 81 is also height adjustable.

Figure 4:
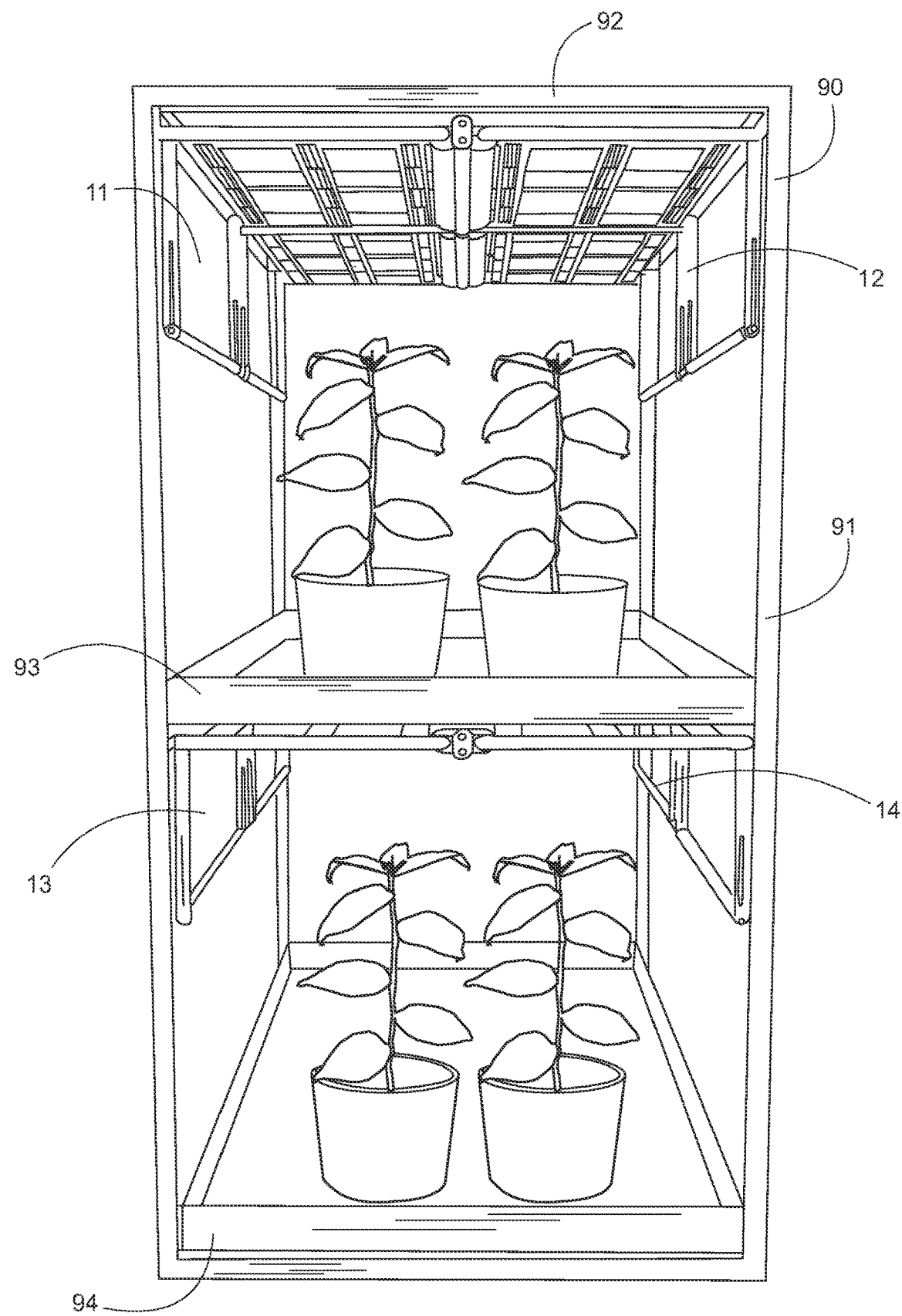
FIG. 4 is a diagram showing installation of four grow lights mounted to a two level frame.

As seen in FIG. 4, the folding grow lights can be mounted to a frame 90 on a double level frame such as shelving or racking. The frame 90 can retain the upper pan 93 and the lower pan 94 with plants growing in the pans. The pans can be partially filled with water for hydroponic cultivation. The grow lights can include a first folding grow light 11 chained to a second folding grow light 12 on an upper level, and then a third folding grow light 13 chained to a fourth folding grow light 14 on a lower level of the frame 90. The frame 90 preferably includes frame vertical support members 91 and frame horizontal support members 92.

Figure 5:
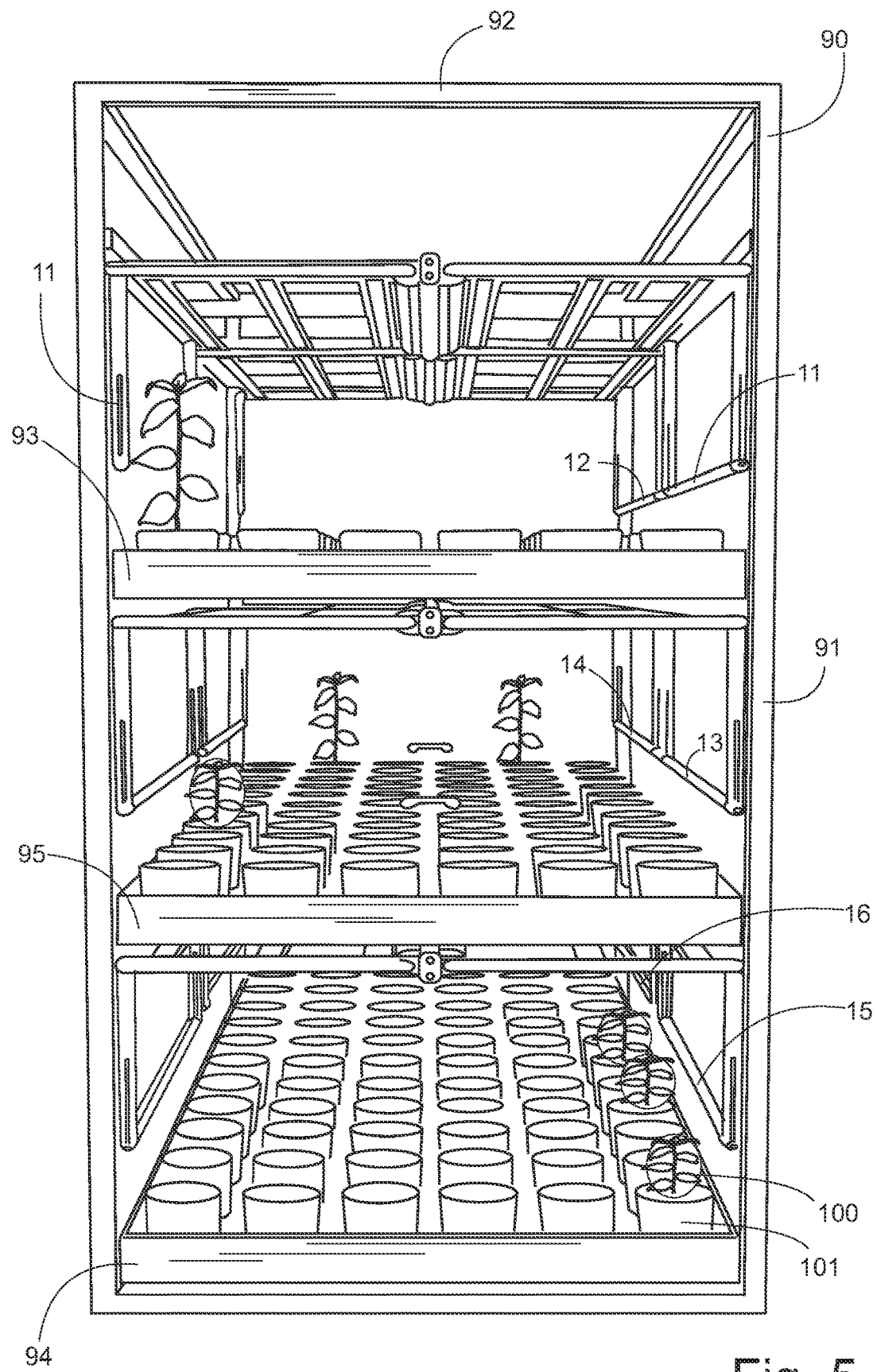
FIG. 5 is a diagram showing installation of six grow lights mounted to a three level frame.

As seen in FIG. 5, the folding grow lights can be mounted to a frame 90 on a triple level frame. The frame 90 can retain an upper pan 93 above a middle pan 95, above a lower pan 94. A first folding grow light 11 can be chained to a second folding grow light 12 on an upper level, and a third folding grow light 13 can be electrically connected to a fourth folding grow light 14 on a middle level. A fifth folding grow light 15 can be electrically connected in parallel or series to a sixth folding grow light 16 on a lower level. The frame vertical support member 91 and the frame horizontal support member 92 of the frame 90 are preferably steel members.

The invention claimed is:

1. A folding grow light comprising:
   a. a main body with a main body housing;
   b. a driver installed to the main body;
   c. right folding arm and a left folding arm, wherein the right folding arm holds a right upper light and, wherein the left folding arm holds a left upper light;
   d. a right front main joint and a right rear main joint connecting the main body to the right folding arm, wherein the right folding arm rotates from a first position that is folded in a vertical orientation to a second position that is unfolded in a horizontal orientation;
   e. a left front main joint and a left rear main joint connecting the main body to the left folding arm, wherein the left folding arm rotates from a first position that is folded in a vertical orientation to a second position that is unfolded in a horizontal orientation;
   f. a front right folding tip joint connecting the right folding arm to a right folding branch and a rear right folding arm tip joint connecting the right folding arm to the right folding branch;
   g. a front left folding tip joint connecting the left folding arm to a left folding branch and a rear left folding arm tip joint connecting the left folding arm to the left folding branch; and
   h. a right lower light mounted to the right folding branch, and a left lower light mounted to the left folding branch.

2. The folding grow light of claim 1, wherein the main body housing retains the driver within the main body housing, further including a plug mounted to the main body housing, further including a socket opposite the plug, wherein the main body housing is formed as an aluminum extrusion, wherein the socket has a first electrical connection and a second electrical connection to allow multiple units of the folding grow light to be connected in a chain.

3. The folding grow light of claim 1, further including an intermediate mode between the folded mode and the deployed mode, wherein the front right folding tip joint and the rear right folding arm tip joint are located opposite the front left folding arm tip joint and the rear left folding arm tip joint, wherein the folding grow light is partially
   unfolded in the intermediate mode with the right folding arm and the left folding arm in a horizontal position, and with the right folding branch and the left folding branch in a horizontal position.

4. The folding grow light of claim 1, further including a left front rail formed on a left front branch member, and further including a left rear rail formed on a left rear branch member, wherein the left lower light is mounted to the left folding branch between the left front rail and the left rear rail, wherein the left lower light is vertically adjustable in its deployed mode, and horizontally adjustable in its intermediate mode.

5. The folding grow light of claim 1, wherein the right front main joint, right rear main joint, left front main joint, and left rear main joint are formed as locking joints so that the right folding arm, and the left folding arm lock into a horizontal position after being rotated from a vertical position.

6. The folding grow light of claim 1, further including a frame having a double level, wherein the frame includes an upper pan and a lower pan, wherein the main body is mounted to the frame.

7. The folding grow light of claim 1, further including a right front rail formed on a right front branch member, and further including a right rear rail formed on a right rear branch member, wherein the right lower light is mounted to the right folding branch between the right front rail and the right rear rail, wherein the right lower light is vertically adjustable in its deployed mode, and horizontally adjustable in its intermediate mode.

8. The folding grow light of claim 7, wherein the main body housing retains the driver within the main body housing, further including a plug mounted to the main body housing, further including a socket opposite the plug, wherein the main body housing is formed as an aluminum extrusion, wherein the socket has a first electrical connection and a second electrical connection to allow multiple units of the folding grow light to be connected in a chain.

9. The folding grow light of claim 7, wherein the right front main joint, right rear main joint, left front main joint, and left rear main joint are formed as locking joints so that the right folding arm, and the left folding arm lock into a horizontal position after being rotated from a vertical position.

10. The folding grow light of claim 7, further including a frame having a double level, wherein the frame includes an upper pan and a lower pan, wherein the main body is mounted to the frame.

11. The folding grow light of claim 7, further including an intermediate mode between the folded mode and the deployed mode, wherein the front right folding tip joint and the rear right folding arm tip joint are located opposite the front left folding arm tip joint and the rear left folding arm tip joint, wherein the folding grow light is partially unfolded in the intermediate mode with the right folding arm and the left folding arm in a horizontal position, and with the right folding branch and the left folding branch in a horizontal position.

12. The folding grow light of claim 11, further including a frame having a double level, wherein the frame includes an upper pan and a lower pan, wherein the main body is mounted to the frame.

13. The folding grow light of claim 11, wherein the main body housing retains the driver within the main body housing, further including a plug mounted to the main body housing, further including a socket opposite the plug, wherein the main body housing is formed as an aluminum extrusion, wherein the socket has a first electrical connection and a second electrical connection to allow multiple units of the folding grow light to be connected in a chain.

14. The folding grow light of claim 11, wherein the right front main joint, right rear main joint, left front main joint, and left rear main joint are formed as locking joints so that the right folding arm, and the left folding arm lock into a horizontal position after being rotated from a vertical position.

15. The folding grow light of claim 14, further including a frame having a double level, wherein the frame includes an upper pan and a lower pan, wherein the main body is mounted to the frame.

16. The folding grow light of claim 14, wherein the main body housing retains the driver within the main body housing, further including a plug mounted to the main body housing, further including a socket opposite the plug, wherein the main body housing is formed as an aluminum extrusion, wherein the socket has a first electrical connection and a second electrical connection to allow multiple units of the folding grow light to be connected in a chain.

17. The folding grow light of claim 16, further including a frame having a double level, wherein the frame includes an upper pan and a lower pan, wherein the main body is mounted to the frame.

18. The folding grow light of claim 1, wherein the right upper light comprises at least one linear array of right LED lights, wherein the left upper light comprises at least one linear array of left LED lights.

\* \* \* \* \*